Jan. 5, 1943.     M. E. REAGAN     2,307,077
MOTOR CONTROL SYSTEM
Filed July 19, 1940
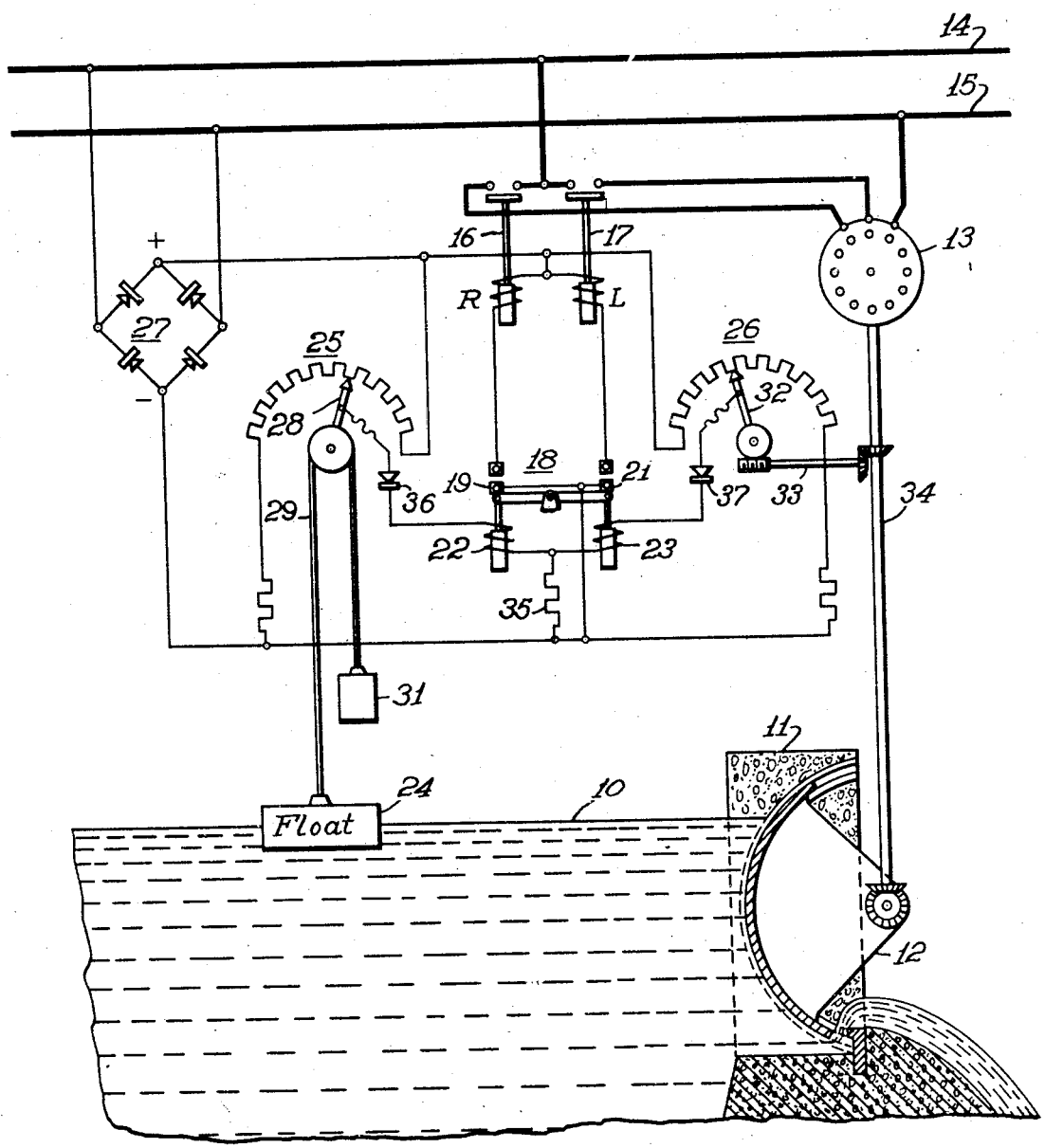
WITNESSES:
Edward Michaels
P. J. Fitzgerald
INVENTOR
Maurice E. Reagan.
BY G. N. Crawford
ATTORNEY Patented Jan. 5, 1943

2,307,077

UNITED STATES PATENT OFFICE 2,307,077

MOTOR CONTROL SYSTEM

Maurice E. Reagan, Pittsburgh, Pa., assignor to Westinghouse Electric & Manufacturing Company, East Pittsburgh, Pa., a corporation of Pennsylvania Application July 19, 1940, Serial No. 346,268

7 Claims. (Cl. 172—239)

My invention relates, generally, to control systems and, more particularly, to systems for automatically regulating or controlling the operation of a motor in accordance with the operating position of an adjustable or variable position control device. While my invention is suitable for general application, it is particularly adapted for water level control and similar uses and it will be described in connection therewith.

Heretofore, various schemes have been utilized for controlling the operation of motor-operated water flow regulating gates in an effort to maintain a constant shoreline or water level. It has been found that these prior schemes do not function with a sufficient degree of accuracy to maintain the desired control of water level, the greatest accuracy obtainable being around two per cent. In many instances it is desirable to maintain a constant shore line if possible or to maintain a constant head of water in the forebay of a hydro-electric plant which is drawing water from a varying source of water supply such, for example, as a body of water formed by a dam in a river. A greater degree of accuracy is also desirable in connection with flood control where it is necessary to accurately control the position of the discharge gate in accordance with water level.

Accordingly, it is the object of my invention, generally stated, to provide a control system for a motor, such as may be used to operate water-control gates, which shall be of simple and economical construction, and which shall have a higher degree of accuracy and sensitivity to changes in water level than systems of the same general nature now in use.

A more specific object of my invention is to provide a control of the character described which shall function to effect operation of the gate-actuating motor in response to very small changes in water level.

Another object of my invention is to provide for controlling the operation of a gate-actuating motor in accordance with water level by means of a highly sensitive differential relay arrangement jointly responsive to water level and gate-opening or position.

A further object of my invention is to provide a water-level regulating control system wherein a differential control relay is utilized for controlling the operation of the gate-actuating motor and is rendered highly responsive to very small variations in water level by means functioning to magnify or amplify current changes in its operating windings in accordance with voltage variations controlled by the gate position with respect to water level.

These and other objects of my invention will become more apparent from the following detailed description when read in conjunction with the accompanying drawing wherein the single figure is a diagrammatic view of a water-level regulating system embodying the principal features of my invention.

In practicing my invention in one embodiment thereof, the operation of the gate-actuating motor, both as to starting and stopping and direction of rotation, to adjust the gate position or opening is controlled in accordance with water level by a float or other water level responsive means, through the medium of a differential relay. The differential relay is jointly responsive to the relative float and gate positions and controlled by voltages determined by the positions controlled by rheostats or potentiometers actuated in accordance with the float and gate positions. The sensitivity and accuracy of the control is increased by connecting a rectifier of the contact type, or other similar device, in series circuit relation with the operating windings on the differential relay.

Referring now to the drawing for a more detailed explanation of the invention, there is shown a body of water 10 which may be held in a reservoir or forebay formed by the dam 11 having an adjustable gate 12. The gate 12 may be actuated to various positions to control the water level by means of a suitable motor 13 which may be energized from a source of alternating current power represented by the conductors 14 and 15. It is to be understood that, in practice, the motor is provided with suitable protective equipment and limit switches to properly limit the gate movements. Since these auxiliary devices are not a part of the present invention, it has been deemed unnecessary to illustrate them.

In order to control the direction of operation of the motor 13, a plurality of reversing switches 16 and 17 are utilized. These switches may be operated to reverse the connections of the motor to the power source to control its direction of rotation in a well known manner.

In this instance, the selective operation of the reversing switches 16 and 17 is effected by means of a differential relay 18 having contact members 19 and 21 and operating windings 22 and 23. It is to be understood that when the differential relay is in a balanced condition, as shown, neither one of the reversing switches will be closed which causes the gate 12 to be held in a stationary position.

In order to provide for controlling the position of the gate 12 in accordance with water level, provision is made for energizing the operating windings 22 and 23 of the differential relay in accordance with the relative positions of the gate 12 and a device which is responsive to water level.

In this instance, this device is in the form of a float 24. The particular apparatus employed for this purpose is a pair of adjustable potentiometers 25 and 26 connected across a source of direct current voltage 27 provided by the full wave rectifier arrangement connected to the supply conductors 14 and 15.

The potentiometer 25 is provided with a movable contact element 28 which is actuated in accordance with water level by connecting it to the float 24 in any suitable manner such, for example, as by means of the rope and pulley arrangement 29 which includes a counterbalancing weight 31. It will be readily understood that, by means of this driving arrangement, the movable contact element 28 of the potentiometer is constantly adjusted in accordance with variations in water level.

The construction of the potentiometer 26 is generally the same except that its movable contact element 32 is actuated in accordance with the gate movements by connecting it through a suitable gear drive 33 to the drive shaft 34 of the motor.

The operating windings 22 and 23 of the differential relay are connected through a common resistor 35 to one side of the direct current source and are individually connected to the movable contact elements 28 and 32 of the potentiometers as shown. It will be apparent that the potentiometers may be adjusted to subject the operating windings 22 and 23 to equal voltages and thereby retain the relay in a balanced condition at any desired water level.

In the operation of the device, should the water level become lowered to any degree, the float 24 actuates the movable contact element 28 in a counterclockwise direction which decreases the voltage applied to the operating winding 22. Under these conditions the force exerted by the operating winding 23 actuates the relay to close its contact members 21 and thereby energize the reversing switch 17. The closure of this switch effects rotation of the gate actuating motor 13 in such direction as to lower or close the gate 12 and thereby diminish the flow of water. The lowering of the gate continues until such time as the movable contact element 32 of the potentiometer 26 reaches a position such that the voltage on the operating winding 23 is substantially equal to the voltage on winding 22 and the relay is again actuated to its balanced position. When this results, the reversing switch 17 is deenergized and the motor 13 stops, so as to retain the gate in the new position. The reverse operation takes place in the event that the water level increases which causes the voltage on the operating winding 22 to become increased and thereby effect the operation of the reversing switch 16 to operate the motor in the reverse direction to raise or open the gate 12.

In order to provide for greatly increasing the sensitivity in the system and make it respond to very small variations in water level, provision is made for increasing the sensitivity of the differential relay 18 by utilizing devices in its operating circuits which will inherently function to magnify the current changes therein. This result is accomplished by means of the rectifier devices 36 and 37 connected in series with the operating windings 22 and 23, respectively. The rectifier devices are in the form of rectifiers of the contact type, the most common form of which is the well known copper-oxide rectifier. These devices have the inherent characteristic of varying their resistance to current flow in a greater proportion than that which results in voltage change alone. The effect of this is to magnify or amplify the flow of current in the circuit in response to a predetermined voltage change. Accordingly it will be apparent that by means of this arrangement the entire system is made more sensitive to very small changes in water level with the result that the water level of the reservoir or stream may be more accurately controlled.

It has been found that systems of this general nature now in use give an accuracy of about two per cent, whereas it has been found that the present system of control will provide a much higher degree of accuracy.

While the system described utilizes potentiometers for controlling the differential relay 18, it is to be understood that any other suitable voltage controlling or producing devices may be substituted therefor if desired. The only condition which must be met is that the balance and the differential relay shall be controlled in accordance with the relative position of the gate 12 and the float 24.

In view of the foregoing description, it will be apparent that the invention provides an extremely simple and accurate system for accurately controlling the water level in a reservoir, river forebay of a hydro-electric station. This system may be constructed of standard apparatus and is of much more simple construction than anything now being used for the same purpose.

While I have illustrated a practical embodiment of my invention, it is to be understood that various changes and modifications may be made therein without departing from the principles of the invention as defined by the appended claims.

I claim as my invention:

1. A control system for a motor comprising, an adjustable control means, means including a relay having opposed electro-responsive operating elements jointly responsive to the relative movements and positions of said motor and adjustable control means to cause said motor to follow the movements of said adjustable control means, and rectifier elements of the contact type connected in series circuit relation with the electro-responsive operating elements of the relay, said rectifier elements being inherently operable to vary their resistance to current flow in a greater proportion than that which results from voltage change above, thereby to increase the sensitivity of the relay to the relative movements of said motor and adjustable control means.

2. A follow-up control for an electric motor comprising, a movable control means, switch means operable to connect the motor to a power source for rotation in either direction, and means comprising a differential relay having opposed electrical operating windings responsive to the relative positions of the movable control means and motor for selectively controlling the operation of the switch means to cause said motor to be operated in a direction and to a degree corresponding to the direction and degree of movement of said control means, said means comprising the differential relay including rectifier elements of the contact type connected in circuit relation with the operating windings of the differential relay, said rectifier elements having the inherent characteristic of varying their resistance to current flow in a greater proportion than that which results from voltage change alone, thereby functioning to increase the sensitivity of the relay.

3. A control system for a motor comprising, an adjustable control means, means including a differential relay having opposed operating elements for selectively controlling the operation of the motor in accordance with the direction and degree of movement of the adjustable control means, energizing circuits for said operating elements of the relay, voltage varying means associated with each of said energizing circuits operable to vary the voltages thereof in proportion to the relative positions of the motor and the adjustable control means to cause said motor to follow the movements of the adjustable control means, and rectifier means of the contact type connected in each of said energizing circuits inherently operable to magnify the current flow therein in response to predetermined changes in the voltage thereof, thereby to increase the sensitivity of the relay to small relative movements of the motor and adjustable control means.

4. A control system for a motor comprising, switch means selectively operable to control the operation of the motor, movable control means operable to produce a voltage proportional to the position thereof, means actuated in accordance with the operation of the motor for producing a voltage proportional to the position thereof, a differential relay having opposed operating windings responsive to said voltages for controlling the operation of the switch means to cause said motor to follow the movements of the movable control means, and rectifier means of the contact type connected in series circuit relation with said operating windings inherently operable to magnify the current flow therein in response to predetermined variations in said voltages, thereby to cause the relay to more readily and accurately respond to the relative movements of the motor and movable control means.

5. A motor control system comprising, a variable position control means, a motor, means including a differential relay having opposed operating windings for selectively controlling the operation of the motor in accordance with the position of said control means, means actuated in accordance with the position of said control means for controlling the energization of one of said operating windings, means actuated in accordance with the position of the motor for controlling the energization of the other operating winding, and rectifier elements of the contact type connected in the energizing circuit of each of said windings, said rectifier elements inherently functioning to increase the sensitivity of the relay and thereby increase the accuracy of the control of the motor.

6. A control system comprising, a motor, a plurality of electrically-operated reversing switches for controlling the direction of rotation of the motor, an adjustable control means, a source of direct-current power, a first potentiometer connected across said source having a movable contact element actuated in accordance with the movements of said adjustable control means, a second potentiometer connected across said power source having a movable contact element actuated in accordance with the movements of said motor, a differential relay operable to control the operation of said reversing switches to cause said motor to follow the movements of the adjustable control means, said relay having opposed operating windings individually connected to one side of the source and the movable contact elements of the potentiometers, and copper-oxide rectifier elements connected in series circuit relation with the operating windings of the relay and functioning to increase the sensitivity of the differential relay through their inherent characteristic of magnifying current flow therethrough in response to predetermined voltage changes.

7. A control system for a motor comprising, an adjustable control means, a plurality of reversing switches for connecting the motor to a power source to effect its operation in opposite directions, a differential relay operable to selectively control the operation of the reversing switches to cause said adjustable control means and motor to maintain predetermined relative positions, said relay having opposed operating windings, a rectifier device connected to the power source to provide a source of direct current for energizing the operating windings of the relay, a pair of potentiometers having movable contact elements connected across the direct current source and having their movable elements connected to the operating windings of the relay to vary the voltage thereof, one of said potentiometers being actuated in accordance with the movements of said adjustable control means, means for actuating the other of said potentiometers in accordance with the movements of the motor and copper-oxide rectifier elements connected in series circuit relation with the operating windings, said rectifier elements being inherently operable to amplify the current flow therein and thereby increase the sensitivity of the differential relay to small changes in the predetermined relative positions of the adjustable control means and motor.

MAURICE E. REAGAN.